(12) United States Patent
Sochtig

(10) Patent No.: US 6,695,011 B2
(45) Date of Patent: Feb. 24, 2004

(54) FLOW REGULATOR

(75) Inventor: Michael Sochtig, Müllheim (DE)

(73) Assignee: Dieter Wildfang GmbH, Mullheim (DE)

( * ) Notice: Subject to any disclaimer, the term of this patent is extended or adjusted under 35 U.S.C. 154(b) by 0 days.

(21) Appl. No.: 10/379,233

(22) Filed: Mar. 4, 2003

(65) Prior Publication Data
US 2003/0209278 A1 Nov. 13, 2003

(30) Foreign Application Priority Data
May 7, 2002 (DE) .......................... 102 20 287

(51) Int. Cl.$^7$ ................................ F15D 1/02
(52) U.S. Cl. .................. 138/43; 138/46; 137/860; 137/516.15
(58) Field of Search .............. 138/43, 45, 46; 137/860, 516.15

(56) References Cited

U.S. PATENT DOCUMENTS

| 2,834,379 A | * | 5/1958 | Fields ............... 138/43 |
| 2,878,836 A | | 3/1959 | Binks |
| 2,936,788 A | | 5/1960 | Dahl et al. |
| 2,960,109 A | | 11/1960 | Wilson |
| 2,989,086 A | | 6/1961 | Dahl |
| 3,189,125 A | | 6/1965 | Windsor et al. |
| 3,216,451 A | * | 11/1965 | Smallpeice ........... 138/46 |
| 3,298,394 A | * | 1/1967 | Chorkey ............. 137/860 |
| 3,837,363 A | | 9/1974 | Meronek |
| 3,847,178 A | * | 11/1974 | Keppel .............. 138/46 |
| 4,000,857 A | | 1/1977 | Moen |
| 4,562,960 A | * | 1/1986 | Marty et al. ......... 138/45 |
| 4,667,700 A | | 5/1987 | Buzzi |
| 5,743,291 A | * | 4/1998 | Nehm et al. .......... 138/46 |

FOREIGN PATENT DOCUMENTS

| AU | 49041 | 10/1990 |
| DE | 14 73 130 A | 11/1968 |
| DE | 1 650 209 | 9/1970 |
| DE | 2 060 751 | 6/1972 |
| DE | 21 31 117 | 1/1973 |
| DE | 26 16 566 | 10/1977 |
| DE | 32 22 548 A1 | 12/1983 |
| DE | 24 03 084 C2 | 9/1985 |
| DE | 296 01 623 U1 | 4/1996 |
| DE | 40 42 642 | 3/2000 |
| DE | 198 51 151 U1 | 5/2000 |
| DE | 200 22 166 U1 | 7/2001 |
| EP | 0 838 743 B1 | 4/1998 |
| FR | 937 898 | 6/1963 |
| GB | 1 350 846 | 4/1974 |

* cited by examiner

Primary Examiner—James Hook
(74) Attorney, Agent, or Firm—Volpe and Koenig, P.C.

(57) ABSTRACT

A flow regulator (1) having a regulator housing (2) in which, in a flow channel, an annular flow restrictor (5) made of elastic material is provided that is pushed onto a fastening post (4) and encircles this post. The post (4) has at least two fastening webs (6), oriented opposite a direction in which the elastic material is pushed on, whose free ends engage the flow restrictor (5) from behind in a securing manner. The flow restrictor (5) limits, between itself and at least one fixed part of the housing, a control gap whose flow cross-section can be modified by the flow restrictor (5), which deforms under the pressure difference that arises during flow. In the flow regulator according to the present invention the fastening webs (6) are fashioned as resilient webs that can be flexibly inwardly deflected. The flow regulator (1) according to the present invention can be manufactured economically and with a low cost, and is distinguished by its high degree of functional reliability.

10 Claims, 1 Drawing Sheet

FLOW REGULATOR

BACKGROUND

The invention relates to a flow regulator having a regulator housing in which, in a flow channel, an annular flow restrictor made of elastic material is provided that is pushed onto a fastening post and encompasses this post. The post has at least two fastening webs, oriented opposite the direction of pushing, whose free ends engage the flow restrictor from behind in a securing manner. The flow restrictor limits, between itself and at least one fixed part of the housing, a control gap whose flow cross-section can be modified by the flow restrictor, which deforms under the pressure difference that arises during flow.

A flow regulator of the type mentioned above is known in which the annular flow restrictor encompasses a central fastening post, past whose free end four fastening webs protrude. After the flow restrictor has been pushed onto the fastening post, through cold forming of the plastic material the fastening webs of the known flow regulator are bent outward and spread in such a way that they secure the annular flow restrictor against loss. However, the manufacturing method used has the disadvantage that, due to the plastic deformation of the originally sleeve-shaped fastening post, and due to the spreading of the fastening webs, an additional assembly step is required that slows the manufacturing process, the formed state is difficult to reproduce precisely, cracks can form in the material, and an apparently "imperfect" outward appearance of the flow regulator often results, leading to complaints from the purchasers of this flow regulator. In addition, if a crack results in the loss of a fastening web and there is a loss of counterpressure, the annular flow restrictor can fall out, resulting in corresponding disturbances in function.

In order to avoid such a cold forming of the fastening webs, a flow regulator is also known that has a fastening post having a massive construction. Securing projections that extend radially outward are provided at opposite sides on this massive fastening post. However, in order to manufacture this known flow regulator, an injection molding die is required that is fashioned as a split mold, or that has what are referred to as plungers in the area of the massive fastening post, so that the securing projections provided on the fastening webs are not sheared off when the injection-molded part is removed from the injection molding die. During the injection molding, the plungers are molded into the cavity from below. However, such plungers are sensitive components that are extremely susceptible to wear. Moreover, only a limited number of plungers can be used, because otherwise the underside of the housing is structurally weakened too much.

Therefore, a flow regulator has also been created whose central regulator core is constructed as a separate cross pin. This cross pin can be guided through the annular opening of the elastic flow restrictor and can subsequently be captively fixed in the regulator housing. However, it is disadvantageous that this known flow regulator is made up of a plurality of parts, and that a plurality of steps are also required in the manufacturing of the regulator housing.

SUMMARY

The object of the present invention is therefore to create a functionally reliable flow regulator of the type indicated at the beginning that can be manufactured economically, with a low cost.

In a flow regulator of the aforementioned type, this object is achieved according to the present invention in that, in particular, the fastening webs are fashioned as resilient webs that can be flexibly inwardly deflected.

The flow regulator according to the invention has a fastening post at which the fastening webs that engage the flow restrictor from behind in a securing manner are fashioned as resilient webs that can be flexibly deflected inward. Through the flexible deflecting inward of the resilient webs, the outer spacing of their ends can be temporarily reduced far enough to allow the elastic flow restrictor to be pushed easily onto the fastening post. After the subsequent resilient expansion of the fastening webs, the flow restrictor is held on the fastening post in a practically captive fashion, so that a loss of the flow restrictor—for example, during shipping of the flow regulator—is prevented, and functional disturbances are avoided. Because the fastening webs can be deflected, a flow regulator constructed as a plastic injection-molded part can also be easily removed from a simple injection molding die, without requiring expensive split molds or injection molding dies having plungers, which are expensive and liable to malfunction.

It is particularly advantageous if the fastening webs engage the flow restrictor from behind with a holding cam or similar expansion that expands the web cross-section, situated on the free end of each web. This expansion, which expands the web cross-section outward in the radial direction, forms an undercut that holds the flow restrictor securely on the fastening post.

In order to facilitate a simple installation of the flow restrictor on the fastening web, and to promote its secure support there, it is useful if the fastening post bears two to eight, and most preferably four fastening webs, arranged crosswise.

Here, a specific embodiment is preferred in which the fastening webs are distributed at uniform intervals around the perimeter of the post.

The fastening webs are integrally formed on the fastening post in particularly stable fashion if the fastening webs are separated from one another by longitudinal slots in the wall of the fastening post.

When the annular flow restrictor is slipped on, the flexible fastening webs are deflected inward practically automatically if the expansions provided on the fastening webs form a leading incline that expands radially outward in the direction of pushing. These installation or leading inclines on the ends of the fastening webs ensure that application can take place rapidly during the installation of the annular flow restrictor, and that the flow restrictor and fastening post find one another easily.

In order to avoid an undesired rotation or twisting of the flow restrictor while it is being pushed onto the fastening post, it is useful if the leading inclines form an angle of 201 to 301 in relation to the longitudinal axis of the web, depending upont the plastic material used.

It is particularly advantageous if the expansions are fashioned so as to be approximately wedge-shaped in longitudinal section.

A preferred specific embodiment according to the present invention provides that the peripheral wall of the housing is connected with the fastening post via radial connecting webs, and that the connecting webs limit the control gap between them.

BRIEF DESCRIPTION OF THE DRAWINGS

Additional features of the invention will be understood from the following description of a preferred embodiment according to the present invention, in connection with the attached drawings. The individual features can be utilized individually or in multiple combinations in a specific embodiment according to the present invention.

DETAILED DESCRIPTION OF THE PREFERRED EMBODIMENT

Figure 1:
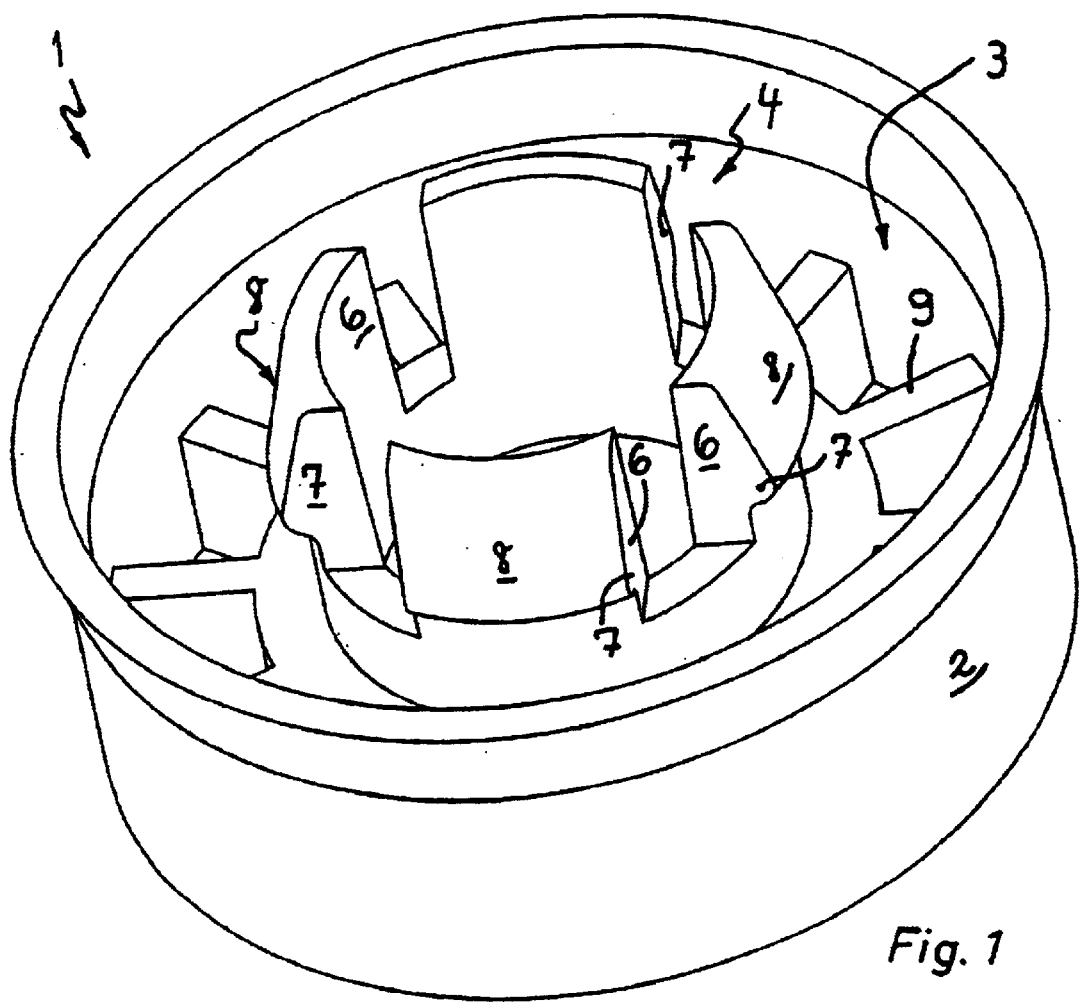
FIG. 1 is a perspective view of a flow regulator having a central fastening post for the pushing on of an annular flow restrictor made of an elastic material.

FIG. 1 shows a flow regulator 1 intended for installation in a sanitary water line. The flow regulator 1 is used to adjust the quantity of water flowing through the water line to a defined maximum value. The flow regulator 1 has a regulator housing 2, in which a flow channel 3 is provided for the water flowing through. A central fastening post 4 is provided in the regulator housing 2.

Figure 2:
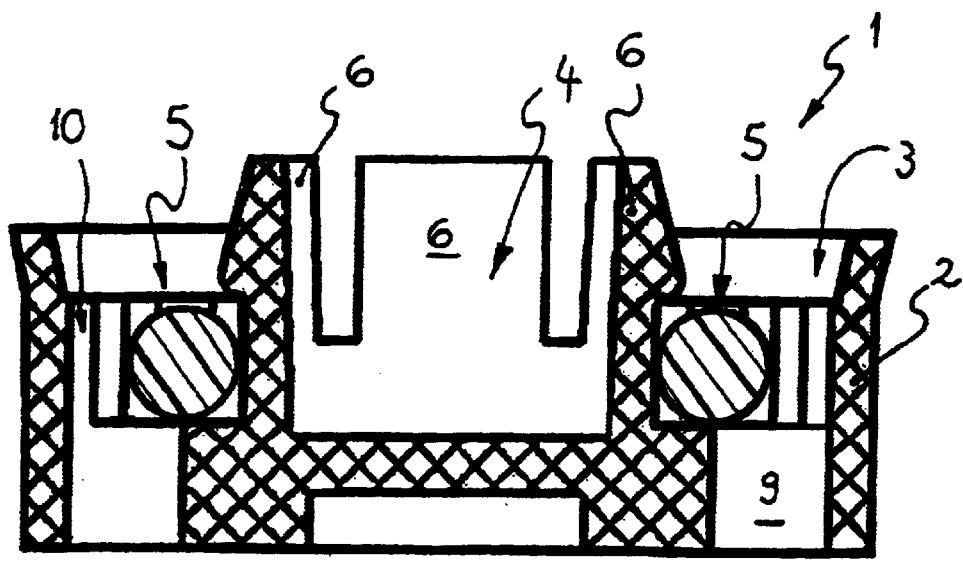
FIG. 2 shows a longitudinal section of a flow regulator comparable to that shown in FIG. 1, whose fastening post is surrounded by an annular flow restrictor made of an elastic material.

As can be seen clearly by comparing FIGS. 1 and 2, an annular flow restrictor 5 can be pushed onto fastening post 4 that limits, between itself and a fixed part of the housing, a control gap whose flow cross-section can be modified by the flow restrictor 5, which deforms under the pressure difference that arises during flow.

Four fastening or holding webs 6 are integrally formed in one piece on fastening post 4, which protrudes opposite the direction of flow. These webs are likewise oriented opposite the direction of pushing for installation of the flow restrictor. On their free ends facing the incoming flow, the fastening webs 6 each have an expansion 7 that expands the web cross-section in the radial direction. The expansions 7 provided on the fastening webs 6 are fashioned so as to be wedge-shaped in longitudinal section, and have a leading incline 8 that expands radially outward in the direction of pushing, onto which the elastic flow restrictor 5 can be pushed.

The fastening webs 6 are fashioned as resilient webs that can be flexibly deflected inward. During the pushing of flow restrictor 5 onto the fastening webs 6, the flexible fastening webs 6 are deflected inward in such a fashion that flow restrictor 5 can be pushed onto fastening post 4 rapidly and comfortably.

In FIG. 2, it can be seen that installation or leading inclines 8 form an angle of 201 to 301 in relation to the longitudinal axis of the web, so that an undesired rotation or twisting of flow restrictor 5 during the pushing onto fastening post 4 is avoided to the greatest possible extent. Wedge-shaped expansions 7 form an undercut that holds flow restrictor 5 on fastening post 4 in practically captive fashion, even during shipping.

The four fastening webs 6 borne by fastening post 4 are distributed with uniform spacing around the periphery of the post, and are separated from one another by longitudinal slots in the wall of the fastening post. During the pushing of annular flow restrictor 5 onto leading inclines 8 of the flexible fastening webs 6, the fastening webs 6 are deflected inward until the flow restrictor 5 is pushed over the undercut formed by fastening webs 6. The flexible construction of fastening webs 6 makes it possible to remove even a regulator housing 2 fashioned as an injection-molded part from a simple injection molding die easily, despite the provided undercut, without requiring an expensive split mold or an injection molding die having plungers.

The fastening post 4, situated centrally in the regulator housing 2, is slotted. The longitudinal slots make fastening post 4 flexible in the area of fastening webs 6. This flexible construction of fastening post 4 enables a simple removal from the injection molding die. Even a regulator housing fashioned as a plastic injection-molded part can thus undergo forced removal from the injection molding die. The design of the required injection molding die is comparatively simple. The four longitudinal slots of fastening post 4 provided between fastening webs 6 form four fastening points for elastic flow restrictor 5. According to the demands made on the quality of the fastening of flow restrictor 5, fastening post 4 can for example also be divided by six or eight longitudinal slots, forming a corresponding number of fastening webs.

During the installation of annular flow restrictor 5, only comparatively small installation forces arise on fastening post 4, because while flow restrictor 5 is being slipped on, this fastening post can contract and contract somewhat. The installation or leading inclines 8 on fastening webs 6 ensure that the annular flow restrictor can be supplied rapidly from above, and that flow restrictor 5 and regulator housing 2 along with one another easily in this process. The reduction of the force is achieved through the combination of elasticity of fastening post 4 and suitable angle at installation on the leading inclines 8. A subsequent bending or deformation at regulator housing 2 in order to fasten flow restrictor 5 is not required. As soon as the annular flow restrictor has reached its defined position, it is held on fastening webs 6 of fastening post 4 by the undercut, and is secured for shipping.

From FIGS. 1 and 2, it is clear that the peripheral wall of the housing is connected with fastening post 4 via radial connecting webs 9, and that connecting webs 9 limit the control gap between them. In FIG. 2, it can be seen that profile cams 10, forming regulating recesses between them, are provided on the inner side of the peripheral wall of the housing, at a distance from one another in the direction of the periphery, and oriented in the direction of flow.

In addition, or instead of this, such profile cams 10 and regulating recesses can also be situated on the outer side of the fastening post, preferably in the unslotted subarea provided beneath fastening webs 6.

What is claimed is:

1. Flow regulator (1) comprising: a regulator housing (2) having a flow channel therethrough, an annular flow restrictor (5) made of elastic material pushed onto and encircling a fastening post (4) located in the flow channel, the post (4) having at least two fastening webs (6), oriented opposite to a direction in which the elastic material is pushed on, and having free ends that engage the flow restrictor (5) from behind in a securing manner, the flow restrictor (5) limiting a control gap located between the flow restrictor and at least one fixed part of the housing, such that a flow cross-section of the control gap is adjustable by the flow restrictor (5), which deforms under a pressure difference that arises during flow, the fastening webs (6) are formed as resilient webs that can be flexibly inwardly deflected.

2. Flow regulator according to claim 1, wherein the fastening webs (6) engage the flow restrictor (5) from behind with a holding cam or an expansion (7) that enlarges the web cross-section free end of each of the webs.

3. Flow regulator according to claim 2 wherein, the fastening post (4) includes at least two of the fastening webs (6) arranged crosswise.

4. Flow regulator according to claim 1 wherein, the fastening post (4) includes at least two of the fastening webs (6) arranged crosswise.

5. Flow regulator according to claim 1 wherein, the fastening webs (6) are distributed at uniform intervals around a periphery of the post.

6. Flow regulator according to claim 1 wherein, the fastening webs (6) are separated from one another by longitudinal slots formed in a wall of the fastening post.

7. Flow regulator according to claim 1, expansions (7) are provided on the fastening webs (6) and form a leading incline (8) that expands radially outward in the direction of pushing.

8. Flow regulator according to claim 7 wherein, the leading inclines form an angle of approximately 20° to 30° in relation to a longitudinal axis of the web.

9. Flow regulator according to claim 8 wherein, the expansions (7) are fashioned so as to be approximately wedge-shaped in longitudinal section.

10. Flow regulator according to claim 1 wherein, a peripheral wall of the housing is connected with the fastening post (4) via radial connecting webs (9), and that the connecting webs (9) limit the control gap between them.

* * * * *